Feb. 13, 1940. C. R. PATON 2,190,218
MOTOR VEHICLE
Filed Feb. 27, 1937 5 Sheets-Sheet 5
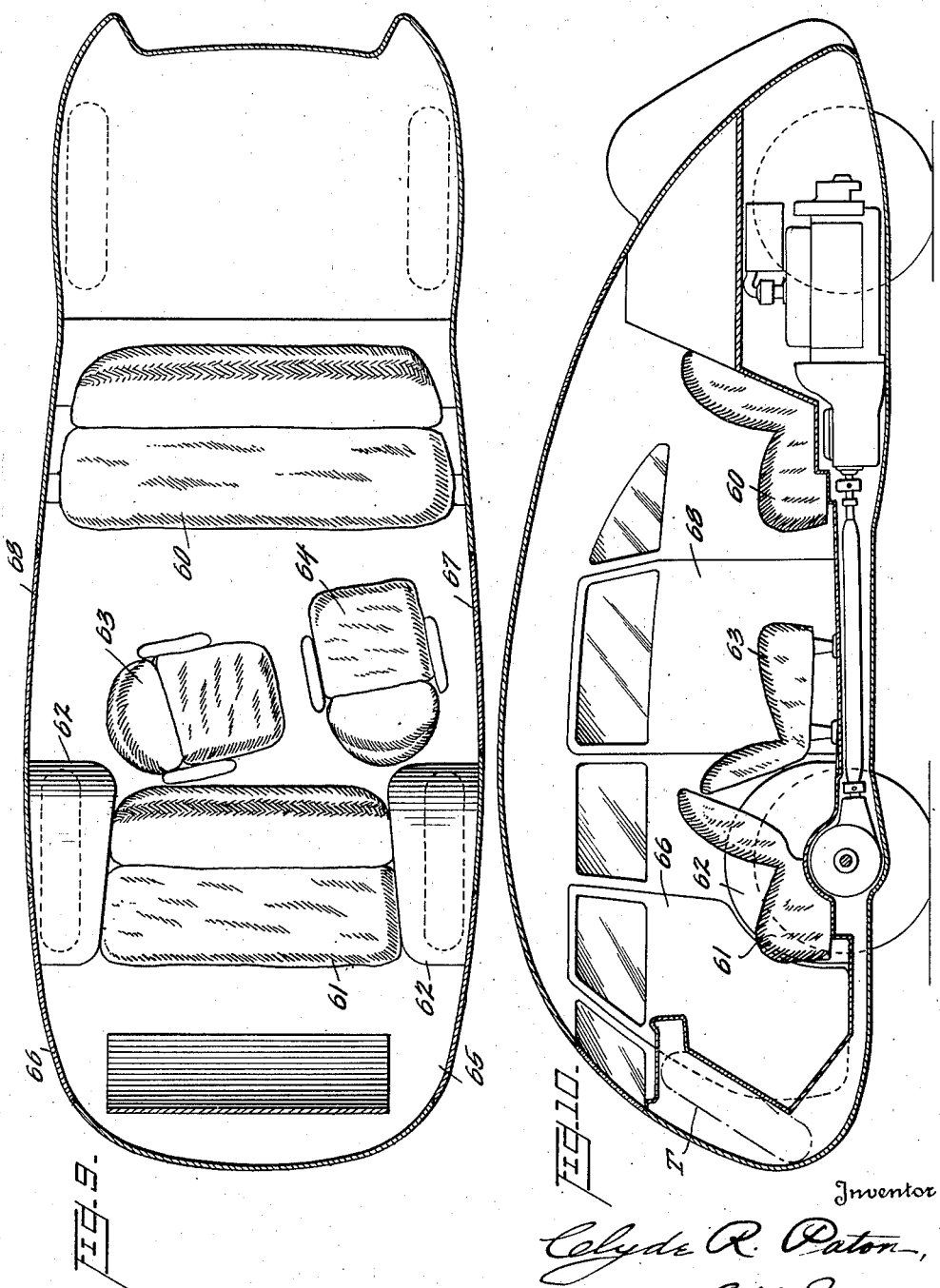

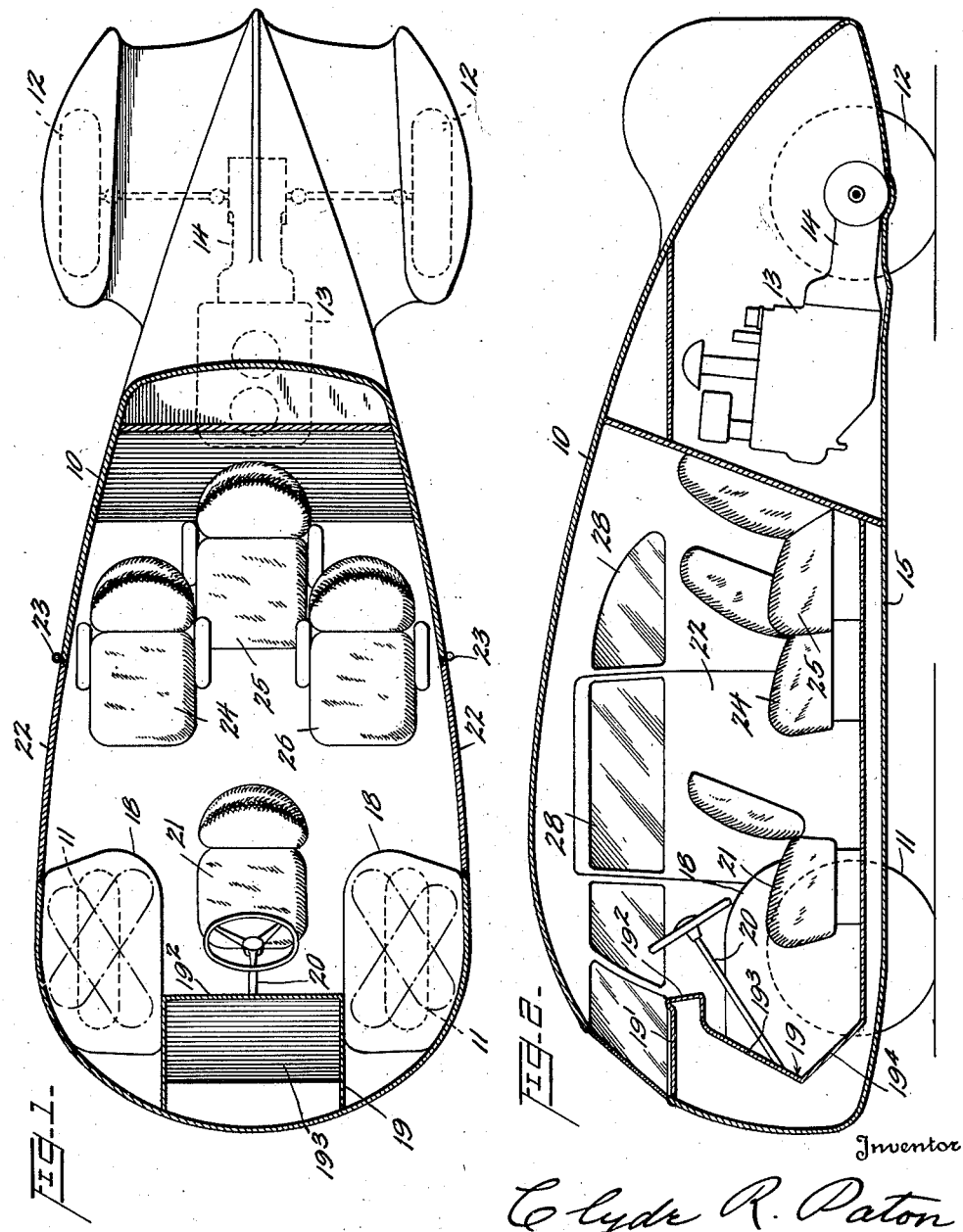

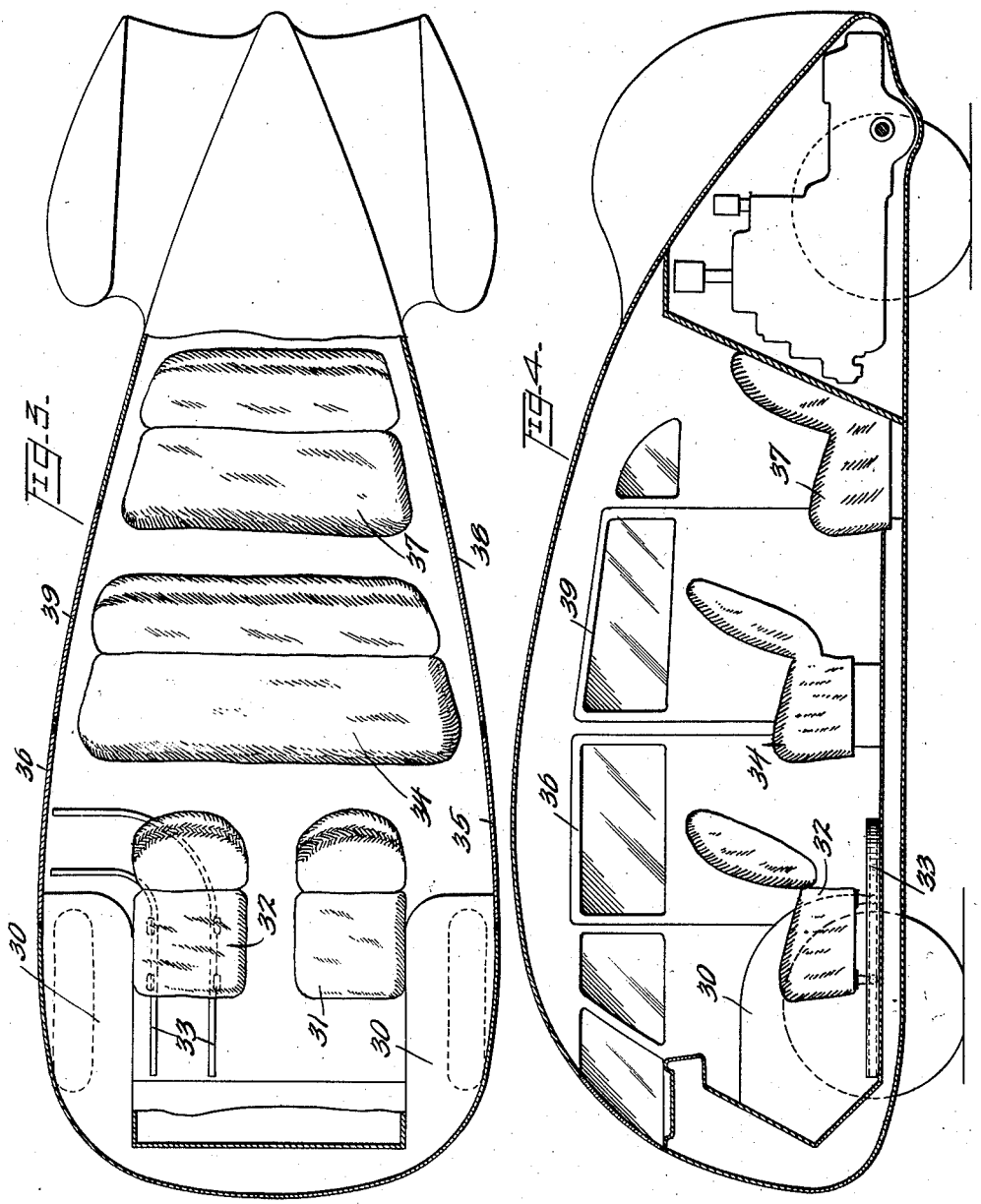

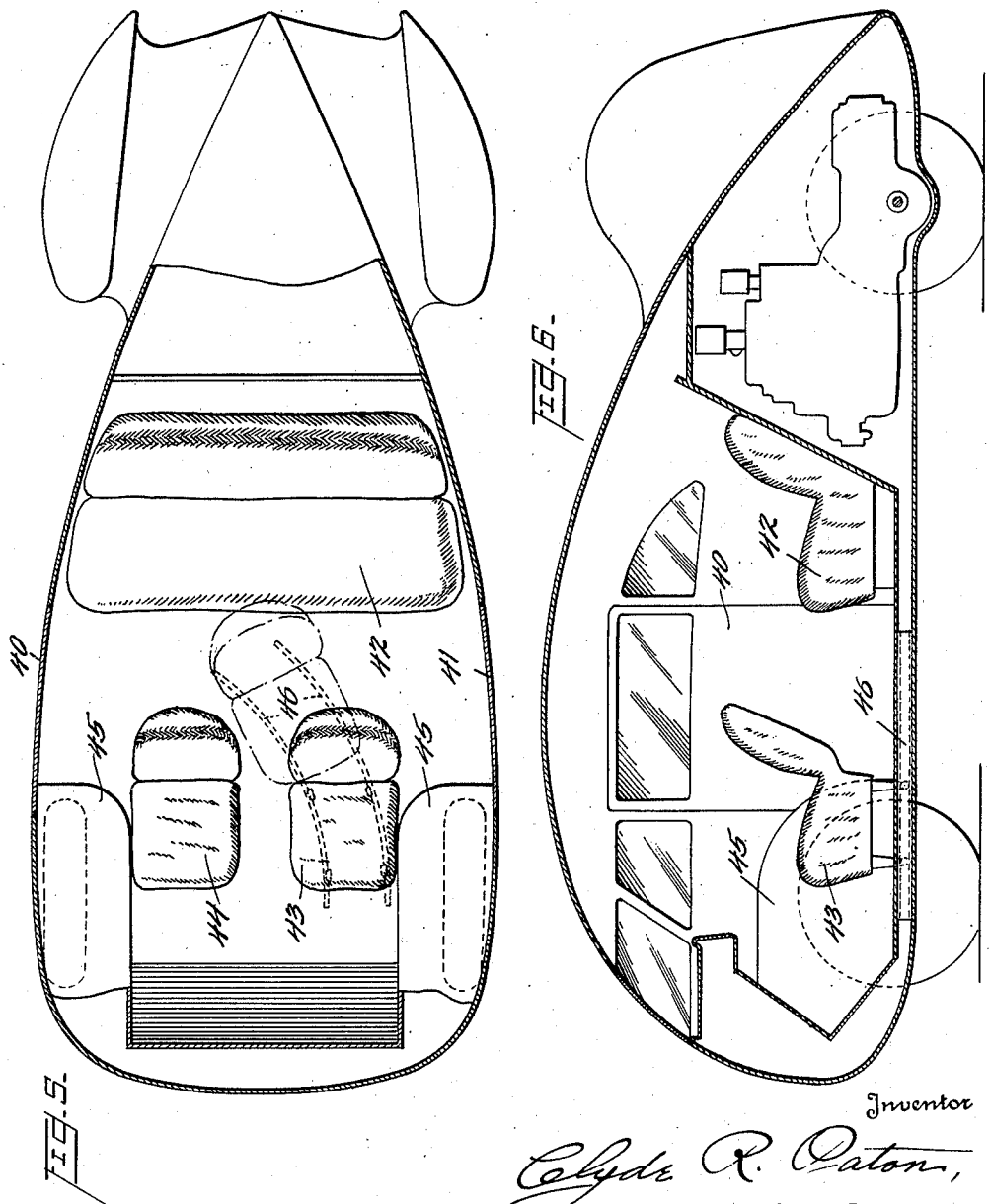

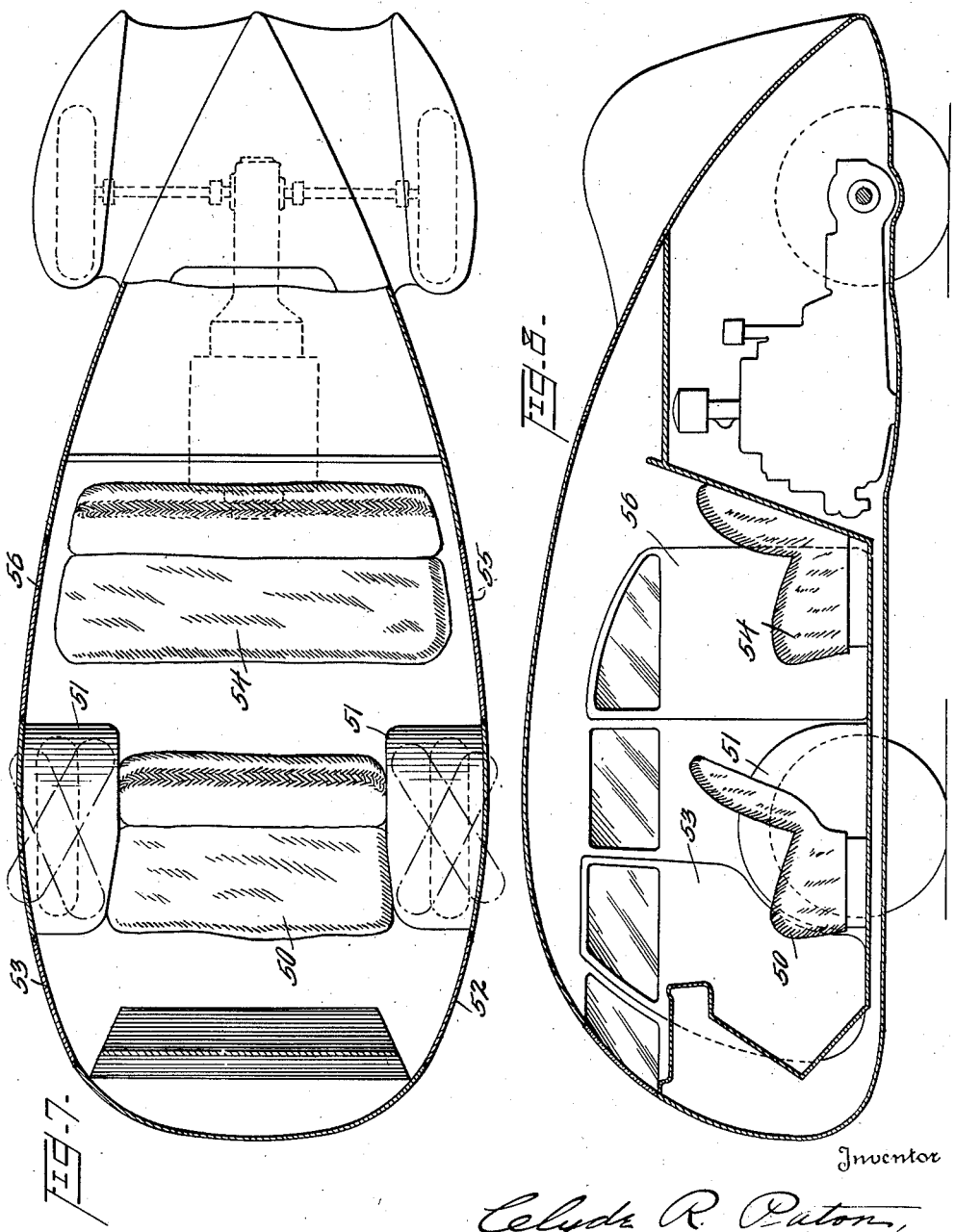

Patented Feb. 13, 1940

2,190,218

UNITED STATES PATENT OFFICE 2,190,218

MOTOR VEHICLE

Clyde R. Paton, Birmingham, Mich., assignor to Packard Motor Car Company, Detroit, Mich., a corporation of Michigan Application February 27, 1937, Serial No. 128,262

11 Claims. (Cl. 296—64)

This invention relates to motor vehicles and primarily to motor vehicles of the type in which the engine or power plant is positioned rearwardly of the compartment or compartments provided for the reception of the operator, other occupants, or lading, as distinguished from motor vehicles of the type now and heretofore widely used and in which the motor is located in advance of the operator's compartment and the space provided for other occupants or lading. The invention is furthermore directed principally to the improvement in design of motor vehicle bodies of the wholly enclosed type although, in certain of its broader aspects, it is applicable to bodies which are not wholly enclosed.

That a motor vehicle with power plant positioned at the rear instead of the front end of the body should have certain substantial advantages over the present conventional type of vehicle, has been generally recognized for some time, and many proposed designs have been heretofore advanced. In addition to the mechanical problems involved in connection with the design of the form of suspension of a motor vehicle of the engine-at-rear type, and the transmission and other mechanical features, the problem of body design is presented for solution. It is important to construct the body in such manner that, within the limited space available, the necessary and essential seating accommodations for operator and passengers are not only present but are disposed in such manner as to promote riding comfort and safety. A major consideration also is to provide a body construction of the type described in which the doors are located in the sides of the body, as is customary in the conventional design, and in which the several seats are so positioned with respect to the door openings that the operator and passengers may freely move from the door openings to their respective seats and from their seats to the door openings. Housing of the wheels within compartments which largely shield and envelop them, to reduce the resistance to the forward motion of the vehicle by the air through which it passes, is likewise considered desirable.

Each of the several vehicle bodies illustrated by way of example includes a motor compartment at or adjacent the rear end of the body and a forward passenger or lading compartment the outside panel of which is upwardly and rearwardly sloped in a vertical plane and symmetrically curved outwardly and rearwardly, in a horizontal plane, in both directions from the longitudinal axis of the body. At least the forward wheels are steerable and in one embodiment of the invention these wheels are included within compartments within the limits of the body itself, the walls of the compartments being fixed, and the spaces for the reception of the steerable wheels being sufficiently large to permit the wheels to move in steering through the widest angles permitted by the steering mechanism, without contacting with the walls of these compartments. To effect this purpose the forward end of the vehicle is constructed of such width that the outer panel of the body envelops the wheels and in fact comprises the outer walls of the wheel receiving compartments. In other embodiments of the invention the forward wheels are located within compartments which open outwardly to permit the wheels to partially protrude when the car is being turned.

A transverse panel extending from one of the vehicle wheel compartments to the other, and located just in rear of the curved central portion of the outer or front panel of the vehicle, comprises the rear wall of a compartment adapted to receive certain portions of the steering mechanism, and for tools or luggage. The space in rear of this transverse panel and intermediate the wheel compartment panels accommodates the steering column and a seat for the vehicle operator and, in certain embodiments of the invention, accommodations for others.

In rear of the operator's seat are additional seats arranged in various ways, and all readily accessible to passengers entering the vehicle through the doors provided. The whole effect is to provide, in connection with a body of the general type described, various interior arrangements of great convenience and utility.

In adapting the invention to vehicles the bodies of which vary in length, minor rearrangements of the several elements of the invention may be effected without departure therefrom, particularly rearrangements which permit ample seating for more than three passengers.

One form of the invention is illustrated by way of example in the accompanying drawings, in which:

Figure 1 is a plan view of one embodiment of the vehicle, portion of the top of the body thereof, however, being broken away in order that the seating arrangement may be more clearly perceived;

Figure 2 is a vertical axial section through the vehicle;

Figures 3, 5, 7 and 9 are generally similar to Figure 1, but show alternative seating arrangements; and Figures 4, 6, 8 and 10 are vertical axial sections through the vehicle bodies illustrated in Figures 3, 5, 7 and 9, respectively.

In the embodiment of the invention illustrated in Figures 1 and 2 the vehicle body is indicated generally at 10, the forward road wheels at 11 and the rear road wheels at 12. An engine of any suitable type is indicated at 13 and the casing enclosing the transmission and differential is indicated at 14. The engine and the casing 14 are of course mounted upon a suitable frame and these elements need not be movable either with respect to the frame or the body. The elements of the frame, however, have been omitted for the sake of clarity of disclosure, the details of the frame comprising no portion of the present invention. The wheels are preferably independently sprung, the rear wheels, or propelling wheels, being connected to the propelling unit by means of driving axles provided with universal joints to permit them to move vertically with respect to the frame and body. The forward wheels 11 are likewise preferably independently sprung by mechanisms which may vary in details of construction, but which may for example be constructed in accordance with the principles laid down in my prior U. S. Letters Patent No. 2,153,271, granted April 4, 1939.

The body 10 is relatively wide and high at the forward end and tapers rearwardly, being preferably shaped substantially as shown. In any case it is widest in the vicinity of the front wheels and tapers rearwardly from there to a point in rear of the axis of the rear wheels. The curvature of the outside panel, or panels, of the body is such as to minimize air resistance at relatively high speeds.

As will be seen most clearly from an inspection of Figure 1, the body 10 is of such width at its forward end, that the curved forward panel thereof envelops the front wheels 11, these wheels being freely steerable to the limits permitted by the steering mechanism, without danger of contact of the tires with the enveloping body panel, the wheels being indicated in the extreme positions to which they may be moved for turning purposes in dotted lines, Figure 1. A bottom plate or panel 15 completely encloses the bottom of the body, extending from end to end thereof, to further minimize air resistance, this plate, however, being cut away in the vicinity of the front wheels, so as not to interfere with the movements of these wheels, the wheels of course projecting downwardly below panel 15 as indicated in Figure 2.

Interior wheel enveloping panels are indicated at 17 and 18 respectively, these panels being horizontally spaced apart as shown and each defining, in conjunction with the wheel enveloping outer panel of the body, a wheel receiving compartment which is completely enclosed save at its bottom. The details of these panels 17 and 18 may vary considerably but they are preferably shaped substantially as shown, the upper portions thereof in advance of the wheels being preferably disposed horizontally so as to comprise supporting shelves for articles. Extending transversely from panel 17 to panel 18 is a transverse panel 19, which may conveniently be shaped in the manner indicated more clearly in Figure 2, having a horizontal portion 19', downwardly or rearwardly inclined portion $19^2$ upon which the various instruments or gauges may be positioned, a downwardly and forwardly inclined portion $19^3$ below the instrument supporting portion $19^2$, and a further downwardly and rearwardly inclined portion $19^4$ which constitutes a foot board. This transverse panel comprises the rear wall of a compartment, intermediate the same and the central portion of the outer panel of the vehicle body, in which compartment portion of the steering mechanism is located and which may likewise comprise a storage space for tools, luggage or the like.

A conventional steering wheel is indicated at 20 and immediately in rear of this, the operator's seat 21, the seat and steering wheel being preferably disposed centrally of the vehicle body but, if desired, being positioned to one side or other of the center. There is sufficient space between the sides of the operator's seat 21 and either one or both of the interior panels 17 or 18 to permit the operator to readily move into driving position from the rear, or to leave driving position by a movement to the rear.

The door openings are indicated at 22, being positioned opposite each other and formed in the sides of the vehicle body. The doors are preferably hinged at 23 so as to swing outwardly and rearwardly. Individual passenger seats are indicated at 24, 25 and 26, the center seat 25 being displaced rearwardly of the two side seats 24 and 26 in order that the passenger immediately in rear of the driver shall have adequate leg room. Window openings are indicated at 28 and such openings, and the windows associated therewith are shaped to provide maximum visibility for the operator and passengers.

The vehicle body illustrated in Figures 3 and 4 is longer than that just described and provides seating accommodations for more occupants. Between the front wheel compartments 30 are located two individual seats one, indicated at 31, being the driver's seat and the other, indicated at 32, being for another occupant. This last mentioned seat is supported upon rollers or other anti-friction means, which roll upon curved trackways 33 so that the seat may be readily moved either forwardly or rearwardly and outwardly to render the driver's seat more accessible. An elongated transversely extending seat is indicated at 34 and seats 31, 32 and 34 may be readily reached by persons entering the vehicle through openings normally closed by doors 35 and 36. A further seat is indicated at 37 and the occupants thereof may leave the vehicle (or enter) through openings normally closed by doors 38 and 39. Accommodations for seven persons are thus provided.

A vehicle body for the accommodation of five occupants is shown in Figures 5 and 6, this body having only two doors, indicated at 40 and 41, an elongated seat for three persons, indicated at 42, in rear of the doors, a driver's seat 43 and an additional seat 44, seats 43 and 44 being located intermediate the wheel compartments 45. Here the driver's seat 43 is slidable along curved trackways 46 rearwardly from normal position to make it possible for the driver to more conveniently leave his seat or pass to the same through the opening normally closed by door 41.

A five occupant body is shown in Figures 7 and 8. Here a continuous seat 50 extends transversely from one wheel compartment 51 to the other and access to this seat is had through openings normally closed by doors 52 and 53. A second transverse continuous seat is indicated at 54, for three occupants, access to which may be had by opening door 55 or door 56.

A similar but larger body is shown in Figures 9 and 10, and in this form of the invention the body is not rearwardly and horizontally restricted to the extent that the bodies of the vehicles previously described are so restricted, in order that it may accommodate an elongated transverse seat 60 well in rear of the transverse seat 61 intermediate the wheel compartments 62. In the space between transverse seats 60 and 61 are located two individual seats 63 and 64 preferably not fixed to the floor and hence movable to suit the desires of their occupants. Forward doors are indicated at 65 and 66 and rearward doors at 67 and 68. This type of body will accommodate seven occupants with comfort to all.

In each form of the invention the vehicle body is of such width in the vicinity of the front wheels as to project beyond the wheels when normally positioned, the wheels being enclosed within wheel compartments. These compartments may open downwardly only, as in the case of the vehicle body illustrated in Figures 1 and 2, or may open both downwardly and outwardly to provide easy access to the wheels, as shown in the remaining figures. In all embodiments convenience of access to the seats and comfort of seated occupants are realized, ample passage and leg room being provided in every instance. Where the individual seats provided are movable along trackways manually operable latching means is provided for securing the seats in normal or adjusted position, and where individual seats or chairs are of the movable type, but not provided with rollers or the like which rest upon trackways, as shown in Figures 9 and 10, the feet of the chairs are preferably provided with coverings of rubber or similar material to prevent slipping. The closed compartment just in advance of the driver's seat, may be employed, as previously explained, for the storage of various articles and in Figure 10 this compartment is shown to contain a spare tire, diagrammatically illustrated at T.

In every case the engine compartment is at the rear of the vehicle body, although the front wheels may be driven therefrom (see Figure 10) if desired, and the general shape of the body is such as to minimize air resistance to forward motion. In each instance the window openings are designed to provide adequate visibility, penetration of light and attractiveness of appearance from within and without.

It will be perceived upon inspection of Figures 7 and 9 that the forward seats 50 and 61, respectively, there illustrated flare or widen forwardly, the adjacent walls of the wheel compartments similarly diverging forwardly. In designing the wheel compartments and intermediate seats advantage is taken of the well-known fact that the wheels are so mounted and moved in turning that the leading portions thereof are moved toward the longitudinal center line of the body through less distances than are the trailing portions (see Figure 7), thus permitting relative inclination of the compartment walls and forward flaring of the seats intermediate the same. Riding comfort of the occupants of the forward seats is thereby promoted.

Having thus described the invention, what is claimed as new and desired to be secured by Letters Patent is:

1. A motor vehicle comprising in combination, forward and rear supporting wheels, the forward wheels being steerable, and a body of the enclosed type mounted upon said wheels, said body having a compartment adjacent the rear wheels for the reception of an engine and a forward compartment for passengers or lading, laterally spaced interior panels defining with the body individual, laterally closed compartments for the steering wheels, a panel extending transversely and comprising the rear wall of a compartment intermediate said steering wheel compartments, and an operator's seat in the space in rear of said transverse panel and between said laterally spaced panels.

2. A motor vehicle comprising in combination, forward and rear supporting wheels, the forward wheels being steerable, a body of the enclosed type mounted upon said wheels, said body having space for an engine at the rear thereof, laterally spaced compartments within the same at the forward end thereof for the reception of the forward steerable wheels, a door opening in the side of the body in rear of one of said wheel compartments, and an operator's seat intermediate said compartments and accessible to one entering the door.

3. A motor vehicle having a body provided with upwardly and laterally closed and downwardly opening compartments for road wheels and a door opening in the side thereof, and an operator's seat positioned intermediate said compartments and accessible to one entering said door opening.

4. A motor vehicle comprising road wheels and body, said body having a closed front and a side door opening, and an operator's seat intermediate the road wheels and accessible to one entering the side door opening.

5. A motor vehicle body of the enclosed type having spaced compartments within the horizontal limits of the body for the reception of steerable wheels, and a seat intermediate said compartments, said seat being supported for movement along a curved path to a position in rear and laterally of its normal position to facilitate access thereto.

6. A motor vehicle body of the enclosed type having spaced panels within the horizontal limits of the same which define compartments for forward steerable wheels, and spaced individual seats for occupants normally positioned intermediate said panels, one of said seats being mounted for movement longitudinally of said body to facilitate access thereto.

7. A motor vehicle comprising in combination, forward and rear supporting wheels, the forward wheels being steerable, and a body mounted upon said wheels, said body having laterally spaced forwardly flaring panels defining the inner walls of compartments for the forward wheels, and a seat extending transversely of the body intermediate said panels, said seat flaring forwardly and the end surfaces thereof being disposed in parallelism to the panels, respectively.

8. A motor vehicle comprising in combination, forward and rear sets of supporting wheels, the forward wheels being steerable, and a body of the enclosed type having horizontally curved outer panelling at its forward end and rearwardly converging lateral panelling smoothly merging with said forward panelling, said body having a compartment therein adjacent the rear wheels for the reception of an engine and a forward compartment for passengers or lading, means defining, in conjunction with the outer panelling of the body, laterally closed individual compartments for the steering wheels, and an operator's seat located in the space between said last named compartments.

9. A motor vehicle comprising in combination, forward and rear sets of supporting wheels, the forward wheels being steerable, and a body of the enclosed type having horizontally curved outer panelling at its forward end and rearwardly converging lateral panelling smoothly merging with said forward panelling, said body having a compartment therein adjacent the rear wheels for the reception of an engine and a forward compartment for passengers or lading, laterally spaced interior panels defining, in conjunction with the outer panelling of the body, transversely spaced and laterally closed individual compartments for the steering wheels, and an operator's seat and steering means intermediate said last named compartments.

10. A motor vehicle comprising in combination, forward and rear supporting wheels, the forward wheels being steerable, and a body of the enclosed type having horizontally curved outer panelling at its forward end which merges smoothly with side panelling, laterally spaced interior panels defining, in conjunction with at least a portion of the curved forward panelling, spaced laterally closed downwardly opening compartments for the steerable wheels, and an operator's seat between said compartments.

11. A motor vehicle body of the enclosed type having interior panels which define with said body laterally closed spaced compartments located within the horizontal limits of the body, a steerable supporting wheel within each of said compartments, and a seat intermediate said compartments, said seat being mounted for movement longitudinally of the body to facilitate access thereto.

CLYDE R. PATON.